April 23, 1963  G. W. SEVERSON  3,086,742
SEAT SUSPENSION
Filed Dec. 20, 1960  3 Sheets-Sheet 1

INVENTOR.
GORDON W. SEVERSON
BY J. C. Wiessler
ATTORNEY

April 23, 1963  G. W. SEVERSON  3,086,742
SEAT SUSPENSION
Filed Dec. 20, 1960  3 Sheets-Sheet 2
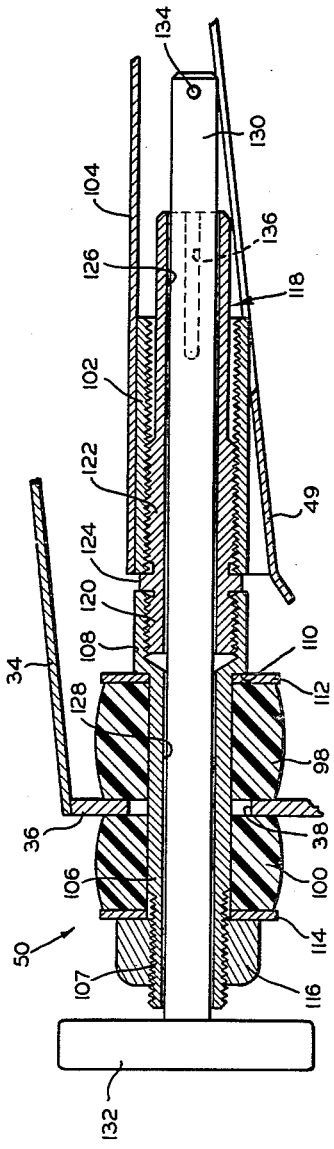
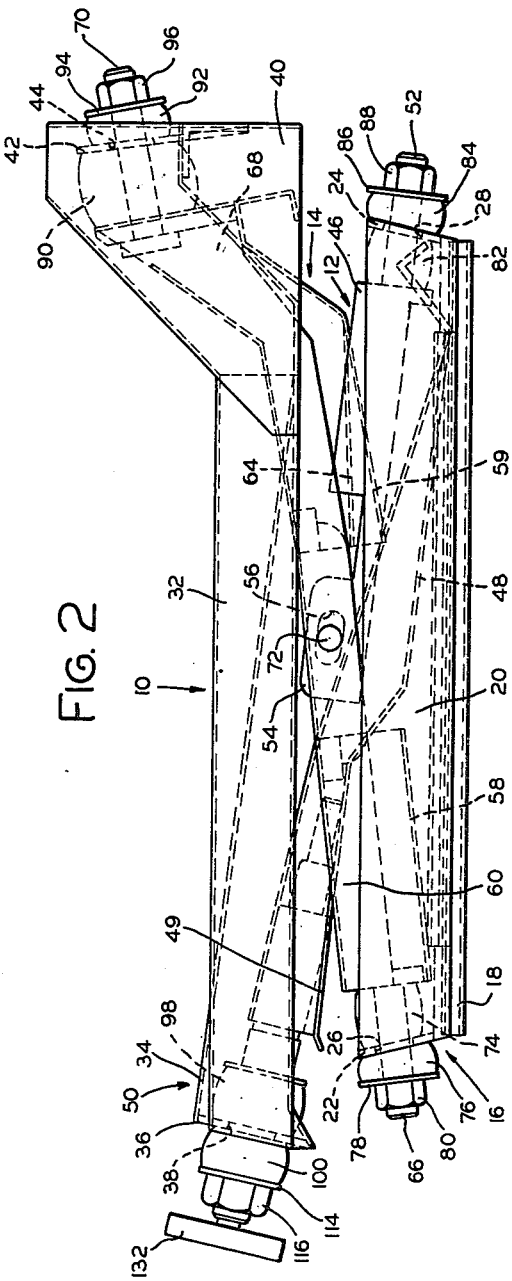
INVENTOR.
GORDON W. SEVERSON
BY
ATTORNEY April 23, 1963   G. W. SEVERSON   3,086,742
SEAT SUSPENSION Filed Dec. 20, 1960   3 Sheets-Sheet 3

INVENTOR.
GORDON W. SEVERSON
BY
ATTORNEY

United States Patent Office

3,086,742
Patented Apr. 23, 1963

3,086,742
SEAT SUSPENSION
Gordon W. Severson, Detroit, Mich., assignor to Clark Equipment Company, a corporation of Michigan
Filed Dec. 20, 1960, Ser. No. 77,159
16 Claims. (Cl. 248—399)

This invention relates to seat suspensions, and more particularly to a resilient seat suspension which is especially useful in unsprung vehicles such as industrial trucks and the like.

In the industrial lift truck field, for example, spring or other suspension systems between the frame and the wheels are not in general use, and it is uncommon to provide in such vehicles any type of shock absorbing suspension which relieves driver fatigue or promotes safety during operation over rough surfaces. Shocks occasioned by running over uneven surfaces are transmitted from the wheels through the frame to the operator, thus resulting frequently in a rough, fatiguing, and sometimes unsafe operation from the operator's standpoint. Trucks designed for outdoor use normally are equipped with pneumatic tires which absorb some portion of the road shocks encountered, but indoor trucks normally are equipped with solid tires. Some trucks of the type under discussion utilize resilient seat cushions, while others do not. A few industrial trucks are equipped with a suspension system, such as leaf or coil springs, between the frame and the wheels, but this is undesirable because it reduces stability of the truck during load lifting operations by the elevatable mast which is mounted at one end of the truck.

My invention has as a principal object the provision of a novel suspension system between the seat and the body of certain classes of vehicles.

In carrying out this object I have found that in providing such a suspension in industrial trucks, for example, driver fatigue is minimized insofar as related to operations over rough surfaces, and the safety factor in operating such trucks is improved with no reduction in vehicle stability.

Another object of my invention is to provide an improved seat suspension construction which provides significant shock absorbing capacity in a relatively small space.

In carrying out my invention I have devised in a preferred embodiment thereof a pair of intersecting seat supporting plate assemblies which are pivotally connected to each other intermediate the ends thereof to provide a generally X-shaped suspension frame in which one end of each plate assembly is mounted by means of resilient spacer member on fixed support means, such as the body of a vehicle, and the other end of each plate assembly is connected to a seat by means of resilient spacer members. Road shocks or other impact forces which would otherwise be transmitted through the seat are absorbed in the resilient spacer members which compress during scissors-like movement of the plate assemblies about the pivoted connection.

The foregoing and other objects, features and advantages of my invention will become apparent in view of the following description taken in conjunction with the drawings, wherein:

FIGURE 2 is a side elevation of the device shown in FIGURE 1;

FIGURE 4 is a sectional view taken on line 4—4 of FIGURE 3 of a weight adjustment sub-assembly of my invention.

Figure 1:
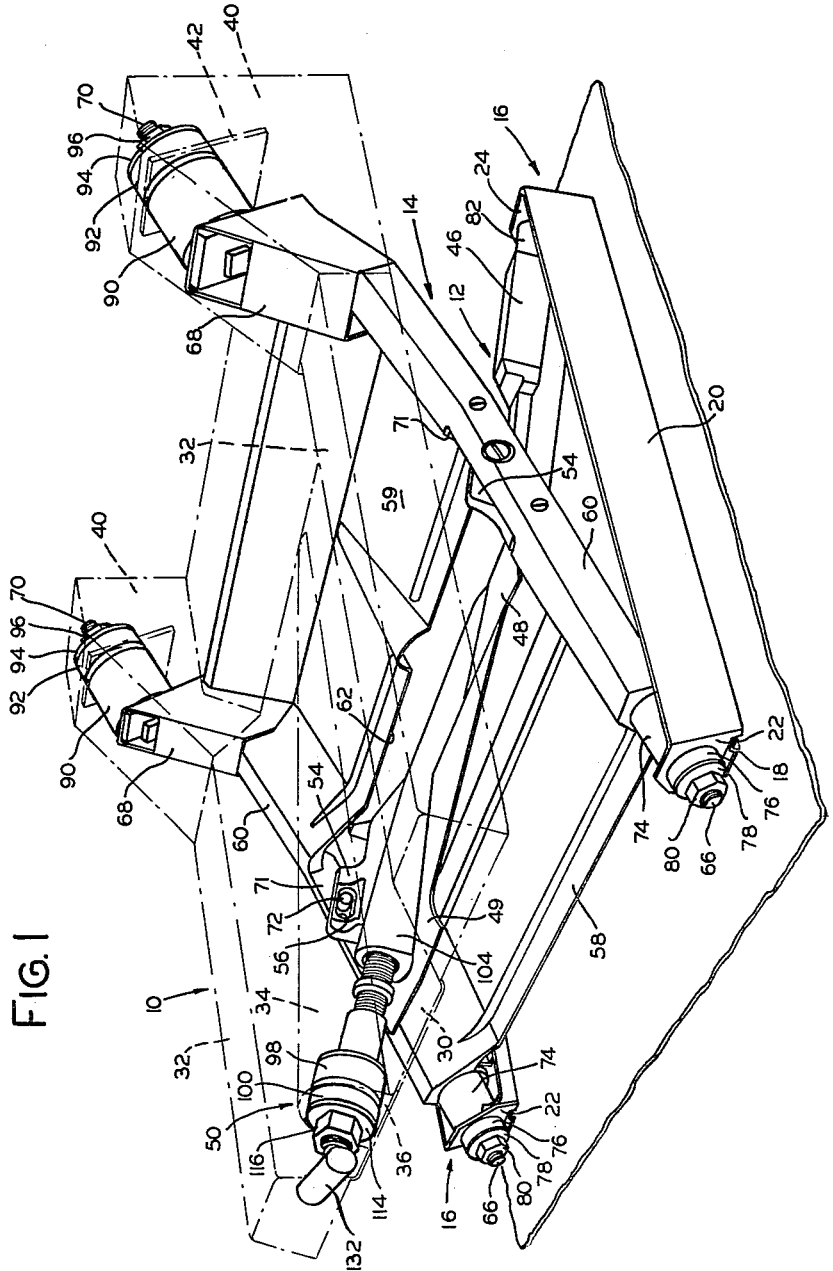
FIGURE 1 is a perspective view of a preferred embodiment of my invention with certain parts thereof shown in phantom outline.

Referring now in detail to the drawings, numeral 10 denotes a seat support assembly which is resiliently mounted on the upper ends of a pair of pivotally connected intersecting plate assemblies 12 and 14 which are in turn mounted resiliently at the lower ends thereof on a pair of transversely spaced parallel base assemblies 16.

Each base assembly 16 comprises a runner track 18 which is adapted to be mounted on the body or frame of an industrial truck or other vehicle and an L-shaped runner 20 slidably mounted on the track 18 for fore and aft movement in order to adjust the seat distance from the steering wheel and other controls. Each L-shaped runner 20 has a pair of longitudinally-spaced, upwardly extending end plates 22 and 24 having therein annular openings 26 and 28, respectively.

The seat support assembly 10 comprises a stamping 30 having a raised inverted U-shaped portion 32 on each side thereof, a raised longitudinally extending, semi-conical portion 34 disposed centrally thereof, an end plate 36 secured to the one end of the raised conical portion 34 and having an opening 38 therein, and a raised truncated portion 40 attached to each side of the rear extremity of the stamping 30, each truncated portion 40 having an end plate 42 secured inwardly thereof with an opening 44 therein.

The plate assembly 12 comprises a pair of longitudinally extending, transversely spaced bars 46 interconnected by a brace plate 48 having a forwardly extending portion 49 between the bars 46, and a longitudinally extending weight adjustment assembly 50, which will be described in detail hereinafter, secured to the brace plate 48 centrally of the bars 46. Each bar 46 has a longitudinally extending stud 52 at one end thereof and an upwardly projecting portion 54 having an elongated slot 56 therein at the other end.

The plate assembly 14 comprises a stamping having raised inverted U-shaped side bars 60 connected by a pair of longitudinally spaced transverse support plates 58 and 59 which provide therebetween a transverse opening 62 extending between the side bars 60, and a raised longitudinally extending, semi-conical portion 64 which provides clearance for the weight adjustment assembly 50 when the seat suspension is assembled and disposed in a collapsed condition. Each side bar 60 has a longitudinally extending stud 66 attached to one end and a raised truncated portion 68 attached to the other end with a longitudinally extending stud 70 secured thereto. Attached to each side portion 60 centrally of a recessed end portion 71 of opening 62 is an inwardly extending pivot pin 72 which is adapted to register with the adjacent slot 56 to form a pivotal connection between the plate assemblies 12 and 14 when the unit is assembled as shown.

The plate assembly 14 is attached to base assemblies 16 by means of studs 66 which extend through openings 26 of end plates 22. Mounted on each stud 66 between the lower end of plate assembly 14 and each end plate 22 is a resilient spacer member 74 of any suitable material, such as rubber. A second resilient spacer member 76 is mounted on each stud 66 on the other side of each end plate 22, being held in place along with each spacer member 74 under predetermined compression by a washer 78 and nut 80.

The plate assembly 12 is connected to base assemblies 16 by means of studs 52 which extend through openings 28 of end plates 24. Mounted on each stud 52 between the lower end of plate assembly 12 and each end plate 24 is a resilient spacer member 82. A second resilient spacer member 84 is mounted on each stud 52 on the other side of each end plate 24, being held in place along with each spacer member 82 under predetermined compression by a washer 86 and nut 88.

The plate assembly 12 extends through opening 62 of plate assembly 14 and is pivotally connected to plate assembly 14 by means of the aforementioned pins 72 and slots 56, portions 54 of bars 46 being located in recesses 71.

The seat support assembly 10, which is adapted to support a seat, not shown, is mounted on the upper ends of plate assemblies 12 and 14 in a manner similar to the mounting of plate assemblies 12 and 14 on base assemblies 16. Assembly 10 is attached to plate assembly 14 by means of a stud 70 which extends from each truncated portion 68 through opening 44 of end plate 42 in each truncated portion 40. Mounted on each stud 70 between the upper end of plate assembly 14 and each end plate 42 is a resilient spacer member 90 of any suitable material, such as rubber. A second resilient spacer member 92 is mounted on each stud 70 on the other side of each end plate 42, being held in place along with each spacer member 90 under predetermined compression by a washer 94 and nut 96. The seat support assembly 10 is attached at the forward end thereof to plate assembly 12 by means of weight adjustment assembly 50. A pair of resilient spacer members 98 and 100 straddle the plate 36 and are mounted upon adjustment assembly 50 in a manner to be described below.

Referring now to FIGURE 4, the weight adjustment assembly 50, which is an integral part of plate assembly 12, includes an internally threaded cylindrical member 102 secured within a longitudinally extending, semiconical portion 104 which is disposed centrally of plate 48 and extends to the forward end of projection 49, a cylindrical member 106 having the forward end portion 107 threaded externally and an enlarged rearward end portion 108 threaded internally and forming a shoulder 110, and an elongated cylindrical connector 118 having oppositely threaded ends 120 and 122 engaging cylindrical members 102 and 108, as shown. A washer 112 abuts shoulder 110 and retains resilient spacer 98 from movement rearwardly away from plate 36. The threaded forward portion of member 106 carries a washer 114 and nut 116 which retains the spacer 100 from movement forwardly away from the forward side of plate 36. An annular projection 124 intermediate the threaded portions of connector 118 establishes the minimum axial spacing of members 102 and 106, opposed ends of which abut projection 124, as shown. Connector member 118 has a bore 126 therethrough coaxial with and spaced adjustably from a bore 128 of member 106. Slidably disposed within and extending through the bores of members 106 and 118 is a rod 130 having a handle 132 attached at the outer end and a transverse pin 134 at the inner end which extends outwardly of the sides of the rod 130 and which is adapted to register with a slot 136 in connector member 118 for adjusting the seat suspension in a manner to be described.

It will be appreciated from the foregoing description that the seat suspension has various parts which are adapted to nest together, thereby tending to maximize available vertical movement of the assembly within a given space. For example, when the seat suspension assembly is in a relatively collapsed condition, the side bars 46 nest at least partially within the side bars 60, as does semi-conical portion 104 nest within semi-conical portion 64, and plate assemblies 12 and 14 within seat support assembly 10.

Figure 3:
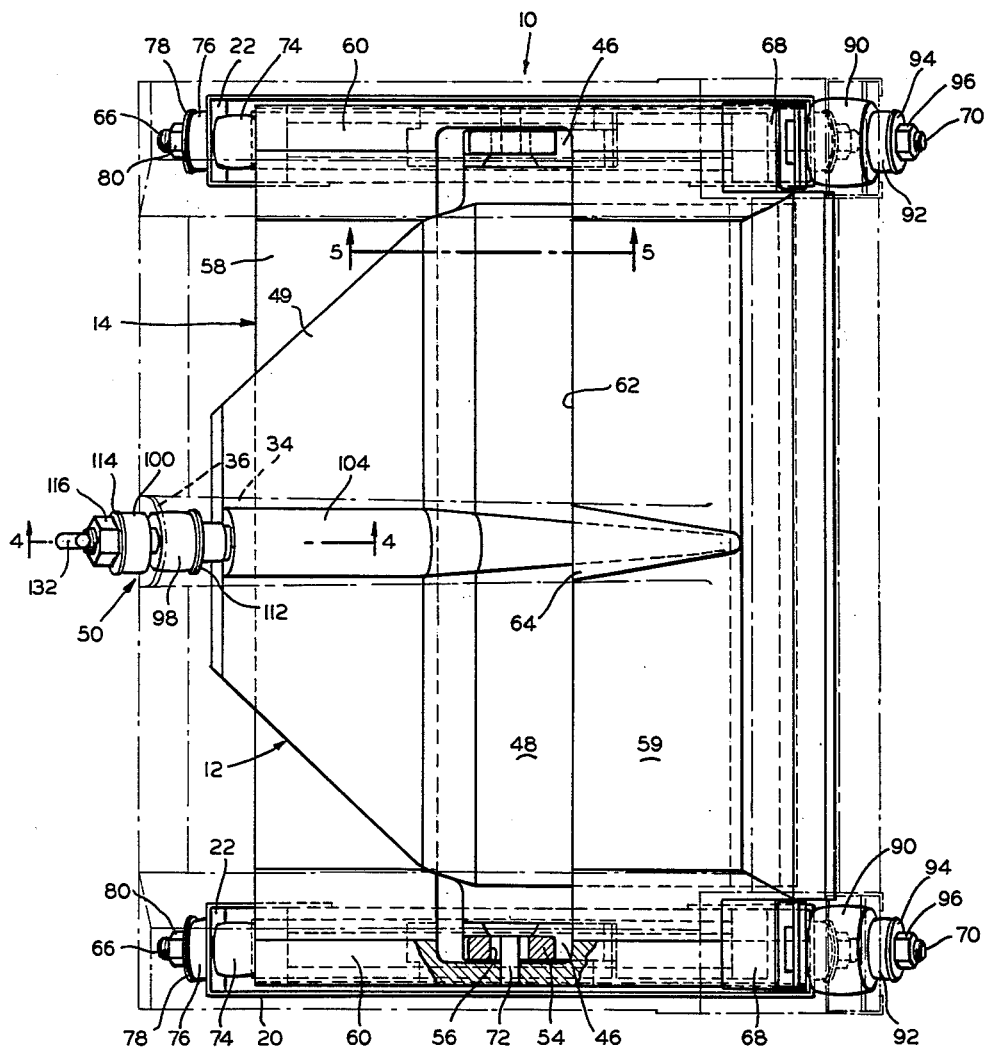
FIGURE 3 is a plan view of the device shown in FIGURE 1 with certain parts thereof shown in phantom outline.
Figure 5:
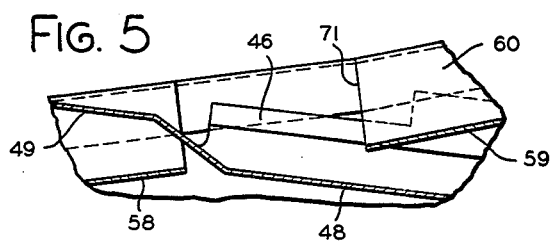
FIGURE 5 is a modification of FIGURES 1-3 showing a view taken along line 5—5 of FIGURE 3 except that the pivotal connection between the plate assemblies is omitted.

FIGURE 5 shows a modification of the preferred embodiment of my invention shown in FIGURES 1 through 3. The modification is the same in structure and operation as the preferred embodiment, except that the pivotal connection 56, 72 is omitted. As will be appreciated, this omission affects in no material way the mode of operation of my invention.

I shall now explain the operation of my invention. As will be appreciated from the foregoing description, the seat suspension broadly comprises a seat support assembly 10 carried resiliently at the upper ends of a pair of plate assemblies 12 and 14 which form with each other a generally X-shaped configuration adapted to pivot at the intersection thereof, the plate assemblies being mounted resiliently at the lower ends thereof upon opposite ends of parallel base assemblies 16.

Road shocks, for instance, which may be imparted to my seat suspension when it is mounted upon a vehicle tend to be absorbed by compressive and expansive action of the several resilient spacer members which are a part thereof. Such action takes place upon relative vertical movement in either direction between seat support assembly 10 and the vehicle. Such relative vertical movement causes changes in the relative angular position of intersecting plate assemblies 12 and 14 which result in changes in the effective length of each of plate assemblies 12 and 14 inasmuch as each such assembly is retained between relatively fixed mounting means, i.e., seat support assembly 10 and base assemblies 16, while the angular relation between each plate assembly and the respective mounting means varies with vertical movement of the seat support assembly 10. The "effective length" of plate assembly 12, as used herein, refers to the length of plate assembly 12, including resilient spacer members 82 and 98 between end plates 24 and 36, and the "effective length" of plate assembly 14 refers to the length thereof, including resilient spacer members 74 and 90, between end plates 22 and 42. Changes in such effective length occur upon compression or expansion of the resilient spacer members at all seven mounting locations of plate assemblies 12 and 14 as relative downward and upward movement, respectively, between the seat and the vehicle takes place.

A desirably low spring rate is obtained as a result of counteracting forces present in the seat suspension. As seat support assembly 10 travels downwardly toward base assemblies 16 as a result of road shock forces, for example, the horizontally directed angle of intersection between plate assemblies 12 and 14 decreases. This change in the geometry of the seat suspension causes an increase in the shock force components which are directed longitudinally of plate assemblies 12 and 14 and which cause resilient spacer members 74, 82, 90 and 98 to compress thereby decreasing the effective lengths of the plate assemblies. Such increasing force components during collapsing movement of the assembly tend to counteract the the simultaneous increasing resistance to further compression of resilient spacer members 74, 82, 90 and 98, thereby effecting desirable shock absorbtion characteristics in that an effectively low spring rate pertains throughout collapsing movement of the suspension assembly. This result is, of course, important and desirable in seat suspension constructions of the type contemplated.

While I have described the relevant force component changes only during downward movement of seat support assembly 10, it will be appreciated that a similar but reverse action occurs during upward movement thereof; i.e., the decrease in the force component due to the change in geometry with an increasing horizontal angle of intersection between the plate assemblies tends to counteract the simultaneous decrease in compression load of resilient spacer members 74, 82, 90 and 98.

It will also be appreciated that the effective length of the plate assemblies 12 and 14 change equally at each connection thereof to seat support 10 and base assemblies 16 during a change in geometry thereof at any given adjustment position of weight adjustment assembly 50, whereby the relative position of pivot pins 72 in slots 56 does not vary and the seat support 10 remains level at all times.

The softness of the ride is affected also, of course, by the mass, density and resiliency of the spacer members, as well as by the length of and the angle between plate assemblies 12 and 14. Therefore, optimum riding qualities may be achieved by proper design of the several resilient spacer members and by the length of and the angle between plate assemblies 12 and 14.

It will also be noted that in the mounting of plate assemblies 12 and 14, resilient spacer members are placed on opposite sides of an intermediate plate; for example, spacers 74 and 76 are disposed on opposite sides of plate 22. This disposition of resilient spacer members results not only in a continuously tight construction of the entire suspension assembly, but also functions to dampen oscillations of the seat support 10 during operation over rough surfaces, for example.

In order to adjust the seat suspension for variations in an operator's weight, weight adjustment assembly 50 is provided. Adjustment is accomplished by grasping the handle 132 and pulling it outwardly until the pin 134 engages the slot 136. It is then possible to rotate the double-threaded connector 118 in either direction by turning the handle 132. Rotating the double-threaded connector 118 in one direction lengthens the plate assembly 12 which raises the normal unloaded position of seat support 10, thereby compensating for an increase in the load carried by the seat by tending to maintain the normal loaded position of seat support 10 at approximately the same elevation as the normal loaded position thereof prior to adjustment. Rotation in the opposite direction decreases the length of plate assembly 12 lowering the normal unloaded position of support 10, thereby compensating for a decrease in the load carried by the seat by tending to maintain the normal loaded position of support 10 as explained above. Since only the length of plate assembly 12 is changed by the weight adjustment assembly 50, it is necessary to provide means to shift the pivotal connection between the plate assemblies 12 and 14 along plate assembly 12 so that the pivotal connection is maintained at a point equidistant from the ends of plate assemby 12, thereby maintaining seat support assembly 10 in a level position. This shifting is accomplished through the pivotal slot and pin connection described above.

From the foregoing it will be appreciated that my invention provides a rugged and virtually maintenance-free novel seat suspension construction which affords a relatively smooth and level "ride."

It should be clearly understood that seat support 10 of the preferred embodiment described herein may be eliminated entirely and plate assemblies 12 and 14 connected resiliently and directly to a seat or other device by means of a trio of seat projections functioning in place of end plates 36 and 42. Furthermore, base assemblies 16 may be replaced by supporting projections which function in place of end plates 22 and 24. Also, the plate assemblies 12 and 14 as described in the preferred embodiment are not essential, since, for example, a single pair of members 46 and 60 may be disposed in a generally X-shaped configuration wherein such members may be pivotally connected or not and in close transverse spaced relationship or not without deviating from the broader aspects of the invention. Also, either the upper or lower resilient spacer members may be eliminated without changing the principal of operation. Of course, weight adjustment assembly 50 comprises a mechanism which may be eliminated without departing from the scope of the invention.

I have mentioned certain obvious changes which may be made in the preferred embodiment as exemplary only, and although only two embodiments have been disclosed in detail, it will be apparent to persons skilled in the art that many other modifications in the form and relative arrangement of parts may be made to suit requirements.

I claim:

1. Seat suspension means comprising fixed support means, movable load support means disposed above said fixed support means, and a pair of connecting members each having a resilient portion and a rigid portion, said members being disposed in a generally X-shaped configuration between said fixed support means and said movable support means, each said member being connected to said fixed support means adjacent one end of said member only and connected to said movable support means adjacent the other end of said member only, an increase in load upon said movable support means causing an increase in the compression loading of said resilient portions and a decrease in the effective length of said members.

2. Seat suspension means comprising support means, relatively movable load support means disposed above said support means, a pair of connecting members disposed in a generally X-shaped configuration between said support means and load support means, and resilient means forming a part of said connecting members and disposed operatively between said connecting members and said support means and between said connecting members and said load support means, said connecting members being connected to said support means and to said load support means only through said resilient means, an increase in load upon said load support means causing an increase in the compression of said resilient means and a decrease in the effective length of said connecting members.

3. For use with a vehicle having seat means, seat suspension means comprising a pair of connecting members disposed in a generally X-shaped configuration between the seat means and the vehicle, and means connecting said members to the seat means and vehicle including resilient means disposed for compression between said connecting members and the vehicle, each said member being connected to the seat means adjacent one end of said support member only and connected to the vehicle adjacent the other end of said member only, shocks transmitted through the vehicle to said suspension being absorbed in increased compression loading on said resilient means.

4. For use with a vehicle having seat means, seat suspension means comprising a pair of connecting members disposed in a generally X-shaped configuration between the seat means and the vehicle, and means connecting said members to the seat means and vehicle including resilient means disposed for compression between said connecting members and the seat means and between said connecting members and the vehicle, each said member being connected to the seat means adjacent one end of said member only, and connected to the vehicle adjacent the other end of said member only, shocks transmitted through the vehicle to said suspension means being absorbed in increased compression loading on said resilient means.

5. A seat suspension comprising a base assembly, a seat support assembly, a pair of connecting members disposed in a generally X-shaped configuration between said base and seat support assemblies, and resilient means disposed between said members and said base assembly and between said members and said seat support assembly forming a part of the effective length of said connecting members, said connecting members being connected to said support assemblies only through said resilient means, an increase in load upon said support assembly causing an increase in compression load on said resilient means and a decrease in effective length of said connecting members.

6. In combination with a vehicle, seat suspension means comprising load support means, a pair of connecting members disposed in a generally X-shaped configuration between said vehicle and load support means, first resilient means disposed in compression between said members and said vehicle and second resilient means disposed in compression between said members and said load support means, said first and second resilient means operatively connecting said members to said vehicle and to said load support means, shock loads transmitted by said vehicle being at least in part absorbed in said resilient means by an increase in the compression loading thereon.

7. Suspension means comprising base means, load support means, a pair of plate assemblies disposed in a generally X-shaped configuration between said base means and load support means, each of said plate assemblies including a pair of longitudinally extending, transversely spaced bars and a transverse brace plate interconnecting said bars, a weight adjustment assembly secured to one of said brace plate for varying the distance between the base means and load support means and resilient means disposed between each pair of said bars and said base means.

8. Suspension means as claimed in claim 7 wherein said weight adjustment assembly comprises a first internally threaded portion attached to said one brace plate, a second internally threaded portion coaxial with said first internally threaded portion, an externally threaded portion threadedly connecting the said internally threaded portions, and adjustment means for rotating said externally threaded portion for changing the axial distance between the said internally threaded portions.

9. Suspension means comprising base means, load support means, a pair of plate assemblies disposed in a generally X-shaped configuration between said base means and load support means, one of said plate assemblies comprising a pair of longitudinally extending, transversely spaced bars and a pair of longitudinally spaced transverse brace plates interconnecting said bars and forming an opening therebetween through which said other plate assembly passes, said other plate assembly comprising another pair of longitudinally extending, transversely spaced bars, a transverse brace plate interconnecting said other pair of bars and a weight adjustment assembly secured to said brace plate, and means connecting said plate assemblies to said base means and to said load support means including a plurality of resilient members mounted between fixed portions of said base means and the one ends of said pairs of bars and between portions of said load support means, said weight adjusting assembly and the other ends of one of said pairs of bars.

10. Seat suspension means as claimed in claim 9 wherein said base means comprises a pair of transversely spaced apart base assemblies, each assembly comprising a track member, a runner member slidably mounted on said track for fore and aft movement and a generally vertically disposed end plate with an opening therein attached at each end of each said runner, said load support means also having a generally vertically disposed end plate with an opening therein attached to each end of said load support means.

11. Suspension means as claimed in claim 10 wherein said connecting means includes longitudinally extending studs attached to said plate assemblies and extending through the respective openings in said end plates for movement relative to said end plates upon compression of said resilient members, said resilient members being interposed between said end plates and said plate assemblies.

12. Suspension means comprising support means, load support means, a pair of connecting members disposed in a generally X-shaped configuration between said support means and said load support means, and resilient means disposed between said members and said support means and between said members and said load support means such that an increase in load upon said load support means causes said resilient means to compress, one of said connecting members including load adjustment means for changing the length of said one connecting member.

13. Seat suspension means comprising fixed support means, movable load support means, a pair of elongated movable assemblies connected at one end to said fixed support means and at the other end to said movable support means, said movable assemblies extending diagonally between said fixed and movable support means in opposite directions, first resilient means disposed between said movable assemblies and said fixed support means, and second resilient means disposed between said movable assemblies and said movable support means, said first and second resilient means receiving in compression loads upon said movable support means, said movable assemblies being connected to said fixed and movable support means only through said first and second resilient means, variations in such loads causing a change in the effective length of said movable assemblies.

14. A seat suspension comprising seat support means, a base assembly, a pair of crossed connecting members pivotally connected to each other and disposed in a generally X-shaped configuration between said seat support means and base assembly, first resilient means disposed between said members and said seat support means, and second resilient means disposed between said members and said base assembly, said connecting members being connected to said seat support means and to said base assembly only through said first and second resilient means, an increase in load upon said seat suspension causing an increase in the compression loading on said first and second resilient means and simultaneously causing a decrease in the effective length of said members.

15. For use with a vehicle having a seat, a seat suspension comprising a pair of transversely spaced base assemblies, a seat support assembly adapted to have a seat attached thereto, a first plate assembly, a second plate assembly which intersects said first plate assembly and is pivotally attached thereto, said plate assemblies being disposed in a generally X-shaped configuration between said base assemblies and said seat support assembly, and resilient spacer members disposed between said plate assembiles and said base assemblies and between said plate assemblies and said seat support assembly, an increase in load upon said seat support assembly causing an increase in the compression loading on said resilient spacer members and simultaneously causing a decrease in the effective length of said plate assemblies.

16. A seat suspension as claimed in claim 15 wherein said first plate assembly includes a longitudinally extending weight adjustment assembly and said pivotal connection comprises a longitudinally extending slot in said first assembly and a pin attached to said second plate assembly and slidably disposed within said slot.

References Cited in the file of this patent

UNITED STATES PATENTS

| 1,734,776 | Pallenberg | Nov. 5, 1929 |
| 2,277,875 | Macbeth | Mar. 31, 1942 |
| 2,916,082 | Wilkinson | Dec. 8, 1959 |
| 2,968,818 | Petersen | Jan. 24, 1961 |

FOREIGN PATENTS

| 746,024 | France | Feb. 27, 1933 |